(12) United States Patent  
Lim et al.

(10) Patent No.: US 12,475,527 B2
(45) Date of Patent: Nov. 18, 2025

(54) IMAGE PROCESSING DEVICE, PROCESSING METHOD THEREOF, AND IMAGE PROCESSING SYSTEM INCLUDING THE IMAGE PROCESSING DEVICE

(71) Applicant: SAMSUNG ELECTRONICS CO., LTD., Suwon-si (KR)

(72) Inventors: Dongpan Lim, Yongin-si (KR); Youngil Seo, Seoul (KR); Jeongguk Lee, Gwacheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 476 days.

(21) Appl. No.: 17/869,484

(22) Filed: Jul. 20, 2022

(65) Prior Publication Data

US 2023/0021444 A1     Jan. 26, 2023

(30) Foreign Application Priority Data

Jul. 20, 2021    (KR) .......................... 10-2021-0095151

(51) Int. Cl.
*G06K 9/00*      (2022.01)
*G06T 3/4015*    (2024.01)
*G06T 5/20*      (2006.01)
*G06T 5/70*      (2024.01)
*G06T 5/73*      (2024.01)
*G06T 7/90*      (2017.01)

(52) U.S. Cl.
CPC .............. *G06T 3/4015* (2013.01); *G06T 5/20* (2013.01); *G06T 5/70* (2024.01); *G06T 5/73* (2024.01); *G06T 7/90* (2017.01); *G06T 2207/20081* (2013.01); *G06T 2207/20084* (2013.01)

(58) Field of Classification Search
CPC ........... G06T 3/4015; G06T 7/90; G06T 5/73; G06T 5/70; G06T 5/20; G06T 2207/20081; G06T 2207/20084
See application file for complete search history.

(56) References Cited

U.S. PATENT DOCUMENTS 6,459,457 B1 * 10/2002 Renner .................. H04N 9/642
                                                    348/638
8,471,921 B1 *  6/2013 Li ........................ H04N 23/843
                                                    348/222.1
(Continued)

FOREIGN PATENT DOCUMENTS

KR    10-1076045 B1    10/2011
KR    10-2055411 B1    12/2019

OTHER PUBLICATIONS

Syu, Nai-Sheng, Yu-Sheng Chen, and Yung-Yu Chuang. "Learning deep convolutional networks for demosaicing." arXiv preprint arXiv:1802.03769 (2018). (Year: 2018).*

(Continued)

*Primary Examiner* — Avinash Yentrapati
(74) *Attorney, Agent, or Firm* — Sughrue Mion, PLLC

(57) ABSTRACT

An image processing method performed by an image processing device may include receiving input image data from an image sensor, selecting a convolution filter corresponding to each unit region from among a plurality of convolution filters based on color pattern information of the input image data, and generating, based on the selected convolution filter, a first image to be displayed from the input image data.

20 Claims, 19 Drawing Sheets

(56) References Cited

U.S. PATENT DOCUMENTS

| | | | |
|---|---|---|---|
| 8,767,101 B2 | 7/2014 | Kim | |
| 9,210,341 B2 | 12/2015 | Imade | |
| 10,460,231 B2 | 10/2019 | Zhang et al. | |
| 10,796,414 B2 | 10/2020 | Vogels et al. | |
| 10,846,828 B2 | 11/2020 | Meyer et al. | |
| 2002/0186309 A1* | 12/2002 | Keshet | G06T 3/4015 348/272 |
| 2015/0022869 A1* | 1/2015 | Shi | H04N 23/843 358/482 |
| 2016/0037044 A1* | 2/2016 | Motta | H04N 25/583 348/221.1 |
| 2020/0012940 A1* | 1/2020 | Liu | H04N 7/0135 |
| 2021/0073957 A1 | 3/2021 | Slabaugh et al. | |
| 2022/0051433 A1* | 2/2022 | Sohn | G06V 20/64 |
| 2022/0398456 A1* | 12/2022 | Gao | G06V 10/96 |

OTHER PUBLICATIONS

Ronneberger et al., "U-Net: Convolutional Networks for Biomedical Image Segmentation", Computer Science Department and BIOSS Centre for Biological Signalling Studies, University of Freiburg, Germany, arXic:1505.04597v1 [cs.CV], May 18, 2015, (8 pages total).

He et al., "Deep Residual Learning for Image Recognition", Microsoft Research, arXiv:1512.03385v1 [cs.CV], Dec. 10, 2015, (12 pages total).

Kokkinos et al., "Deep Image Demosaicking using a Cascade of Convolutional Residual Denoising Networks", European Conference on Computer Vision, Sep. 2018, 18 pages total.

Tan et al., "Deep Demosaicking: Adaptive Image Demosaicking via Multiple Deep Fully Convolutional Networks", IEEE Transactions on Image Processing, vol. 27, Issue 5, May 2018, 15 pages total.

\* cited by examiner

FIG. 9 cp1

| G | R | G | R | G | R | G | R |
|---|---|---|---|---|---|---|---|
| B | G | B | G | B | G | B | G |
| G | R | G | R | G | R | G | R |
| B | G | B | G | B | G | B | G |
| G | R | G | R | G | R | G | R |
| B | G | B | G | B | G | B | G |
| G | R | G | R | G | R | G | R |
| B | G | B | G | B | G | B | G | cp2

| G | G | R | R | G | G | R | R |
|---|---|---|---|---|---|---|---|
| G | G | R | R | G | G | R | R |
| B | B | G | G | B | B | G | G |
| B | B | G | G | B | B | G | G |
| G | G | R | R | G | G | R | R |
| G | G | R | R | G | G | R | R |
| B | B | G | G | B | B | G | G |
| B | B | G | G | B | B | G | G | cp3

| W | G | W | R | W | G | W | R |
|---|---|---|---|---|---|---|---|
| G | W | R | W | G | W | R | W |
| W | B | W | G | W | B | W | G |
| B | W | G | W | B | W | G | W |
| W | G | W | R | W | G | W | R |
| G | W | R | W | G | W | R | W |
| W | B | W | G | W | B | W | G |
| B | W | G | W | B | W | G | W | cp4

| G | G | G | R | R | R | G | G |
|---|---|---|---|---|---|---|---|
| G | G | G | R | R | R | G | G |
| G | G | G | R | R | R | G | G |
| B | B | B | G | G | G | R | R |
| B | B | B | G | G | G | R | R |
| B | B | B | G | G | G | R | R |
| G | G | G | R | R | R | G | G |
| G | G | G | R | R | R | G | G | cp5

| W | G | W | G | W | G | W | G |
|---|---|---|---|---|---|---|---|
| B | W | R | W | B | W | R | W |
| W | G | W | G | W | G | W | G |
| R | W | B | W | R | W | B | W |
| W | G | W | G | W | G | W | G |
| B | W | R | W | B | W | R | W |
| W | G | W | G | W | G | W | G |
| R | W | B | W | R | W | B | W | cp6

| G | G | G | G | R | R | R | R |
|---|---|---|---|---|---|---|---|
| G | G | G | G | R | R | R | R |
| G | G | G | G | R | R | R | R |
| G | G | G | G | R | R | R | R |
| B | B | B | B | G | G | G | G |
| B | B | B | B | G | G | G | G |
| B | B | B | B | G | G | G | G |
| B | B | B | B | G | G | G | G |

IMAGE PROCESSING DEVICE, PROCESSING METHOD THEREOF, AND IMAGE PROCESSING SYSTEM INCLUDING THE IMAGE PROCESSING DEVICE

CROSS-REFERENCE TO RELATED APPLICATION

This application is based on and claims priority under 35 U.S.C. § 119 to Korean Patent Application No. 10-2021-0095151, filed on Jul. 20, 2021, in the Korean Intellectual Property Office, the disclosure of which is incorporated by reference herein in its entirety.

BACKGROUND

The inventive concept relates to an image processing device for performing a neural network operation, an operation method thereof, and an image processing system including the image processing device, and particularly, to an image processing device for performing a convolution operation based on color pattern information of input image data, an operation method thereof, and an image processing system including the image processing device.

A neural network refers to a computational architecture that models the biological brain. With the recent development of neural network technology, research on analyzing input data received from a sensor and extracting valid information by using neural network devices in various types of electronic systems has been actively conducted.

However, technology using deep learning has a problem in that it takes a long time to process data in mobile devices with low computational power due to a large amount of computation. In order to apply deep learning technology to mobile devices, it is necessary to reduce the processing time by reducing network complexity, however, the image quality may be reduced in this process. Accordingly, when the deep learning technology is applied to mobile devices, there is a need for a technology capable of increasing the quality of generated image data while reducing the amount of computation required to process input data in a neural network.

SUMMARY

The inventive concept provides an image processing device for selecting a convolution filter having different weight values based on color pattern information of input image data and performing a convolution operation during processing of input image data generated by a sensor through deep learning.

According to an aspect of the inventive concept, there is provided an image processing method performed by an image processing device including receiving input image data from an image sensor, selecting, based on color pattern information of the input image data, a convolution filter corresponding to each unit region from among a plurality of convolution filters, and generating a first image to be displayed from the input image data, based on the selected convolution filter.

According to another aspect of the inventive concept, there is provided an image processing device including a memory configured to store an image processing program, and a processor configured to execute the image processing program stored in the memory and operate as instructed by the image processing program to receive input image data from an image sensor and to select, based on color pattern information of the input image data, a convolution filter corresponding to each unit region from among a plurality of convolution filters, to be applied to the input image data.

According to another aspect of the inventive concept, there is provided an image processing system including an image sensor configured to generate a Bayer pattern image based on a received optical signal, an image signal processor configured to convert the Bayer pattern image received from the sensor into an RGB image to be displayed, and a display configured to display the RGB image. The image signal processor may select, based on color pattern information of the Bayer pattern image, a convolution filter corresponding to each unit region from among a plurality of convolution filters.

BRIEF DESCRIPTION OF THE DRAWINGS

The above and other aspects and features of the disclosure will become more apparent by describing in detail example embodiments thereof with reference to the accompanying drawings, in which:

FIG. 9 is a diagram illustrating a type of input data of an image processing device according to an example embodiment of the inventive concept;

DETAILED DESCRIPTION

Hereinafter, example embodiments of the inventive concept will be described in detail with reference to the accompanying drawings.

Figure 1:
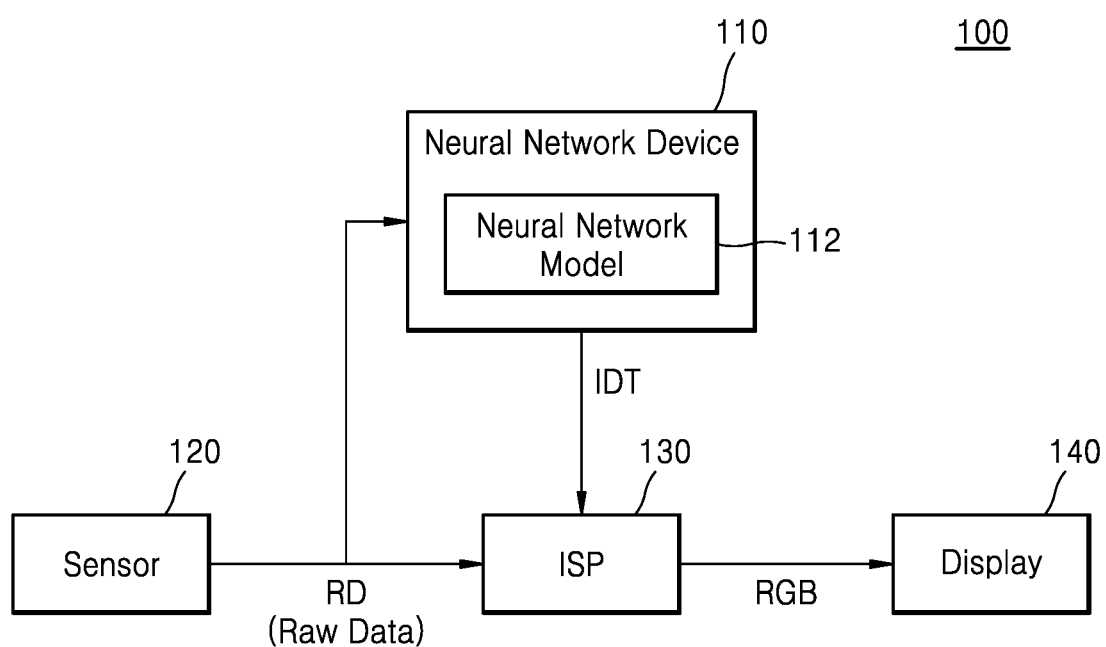
FIG. 1 illustrates an image processing system according to an example embodiment of the inventive concept.

FIG. 1 illustrates an image processing system according to an example embodiment of the inventive concept.

An image processing system 100 may include a neural network device 110, a sensor 120, an image signal processor 130, and a display 140. In addition to this, the image processing system 100 may further include other general-purpose components such as a memory, a communication module, a video module (for example, a camera interface, a joint photographic experts group (JPEG) processor, a video processor, a mixer, and so on), a third dimensional (3D) graphics core, an audio system, a display driver, a graphic processing unit (GPU), and a digital signal processor (DSP).

The neural network device 110 may extract valid information by analyzing input data based on a neural network and determine a surrounding situation based on the extracted information or control components of an electronic device on which the neural network device 110 is mounted. For example, the neural network device 110 may be applied to a drone, an advanced driver assistance system (ADAS), a smart TV, a smartphone, a medical device, a mobile device, an image display device, a measurement device, Internet of things (IoT), and so on and may be mounted on one of various electronic devices.

The neural network device 110 may generate a neural network, train the neural network, perform learning, or perform a neural network operation based on received input data and may generate an information signal based on an operation result or retrain the neural network. The neural network device 110 may include a hardware accelerator for implementing the neural network. The hardware accelerator may correspond to, for example, a neural processing unit (NPU), a tensor processing unit (TPU), a neural engine, and so on which are dedicated modules for executing a neural network but is not limited thereto.

The neural network device 110 according to an embodiment of the inventive concept may implement the neural network model 112. The neural network model 112 may include a deep learning model that is trained to perform a certain purpose operation such as image classification or image division. The neural network model 112 may include a neural network model used to extract an information signal for the image processing system 100. The neural network model 112 may include, for example but not limited to, at least one of various neural network models such as a convolution neural network (CNN), a region with convolution neural network (R-CNN), a region proposal network (RPN), a recurrent neural network (RNN), a stacking-based deep neural network (S-DNN), a state-space dynamic neural network (S-SDNN), a deconvolution network, a deep belief network (DBN), a restricted Boltzmann machine RBM), a fully convolutional network, a long short-term memory (LSTM) network, and a classification network.

The neural network model 112 may be generated by being trained by a training device (for example, a server that trains a neural network based on a large amount of input data), and a trained neural network model 112 may be implemented by the neural network device 110. Hereinafter, in the inventive concept, the neural network model 112 means a neural network in which configuration parameters (for example, network topology, bias, weight, and so on) are determined through training. The configuration parameters of the neural network model 112 may be updated through retraining by the training device, and the updated neural network model 112 may be applied to the neural network device 110.

The sensor 120 may obtain sensed data by sensing a peripheral physical signal. The sensor 120 may be implemented by at least one of various sensors, such as an imaging device, an image sensor, a light detection and ranging (LIDAR) sensor, an ultrasonic sensor, a depth sensor, and an infrared sensor.

The sensor 120 may include a sensing core (for example, a sensing array including sensing elements for receiving physical signals) and a read circuit (or a peripheral circuit) for processing a signal received from the sensing core and outputting sensed data. The sensor 120 may output raw data RD which is not changed in data format of sensed data. Unique characteristics of the sensor 120, for example, physical characteristics of a sensing core, a data pattern of sensed data, and so on may be reflected in the raw data RD. For example, when the sensor 120 is an image sensor, an image of a Bayer pattern may be output as the raw data RD.

When the sensor 120 is an image sensor, the raw data RD may have a data pattern such as an RGB pattern, an RGBG pattern, or an RGBW pattern according to the type of the sensing array provided in the sensor 120. In this case, the RGB pattern indicates a pattern having a structure in which red pixel value, a green pixel value, and a blue pixel value are repeated, and the RGBG pattern indicates a pattern in which a red pixel value, a green pixel value, a blue pixel value, and a green pixel value are repeated, and the RGBW pattern indicates a pattern having a structure in which a red pixel value, a green pixel value, a blue pixel value, and a white pixel value are repeated.

When the raw data RD generated by the sensor 120 has to be displayed on the display 140, the ISP 130 may convert the raw data RD into a data format suitable to be displayed, for example, RGB data (RGB). The display 140 may display the RGB data (RGB) received from the ISP 130. In addition, the neural network device 110 may receive the raw data RD and generate data IDT suitable to be displayed through the neural network model 112.

Figure 2:
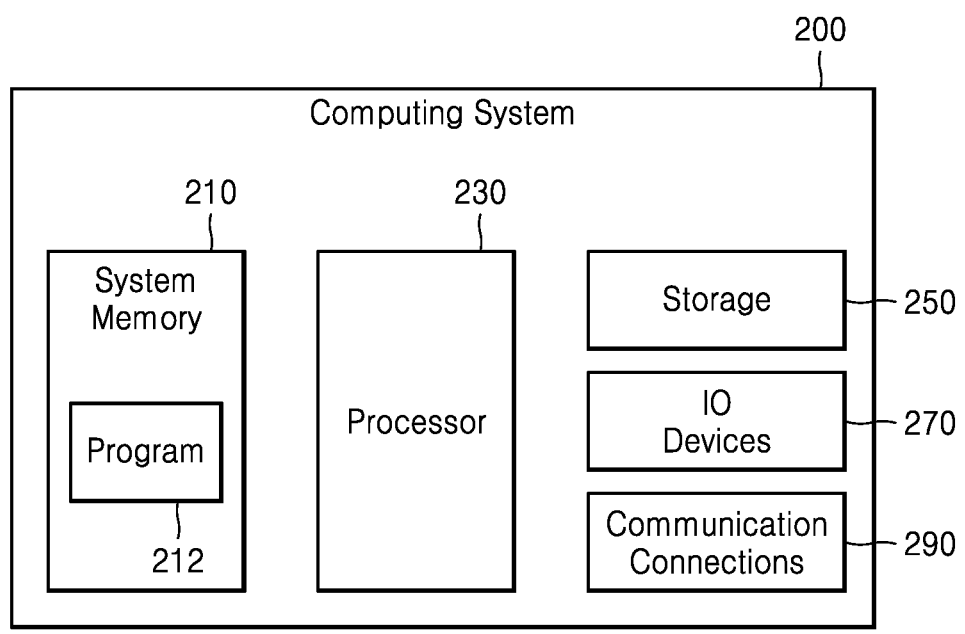
FIG. 2 is a block diagram illustrating an image processing device according to an example embodiment of the inventive concept.

FIG. 2 is a block diagram illustrating an image processing device according to an example embodiment of the inventive concept.

In some embodiments, the image processing system 100 of FIG. 1 may include an image processing device 200 of FIG. 2. As illustrated in FIG. 2, the image processing device 200 may include a system memory 210, a processor 230, a storage 250, input/output devices 270, and communication connections 290. Components included in the image processing device 200 may be connected to each other to communicate with each other, for example, via a bus.

The system memory 210 may include a program 212. The program 212 may cause the processor 230 to perform quantization of an artificial neural network according to example embodiments of the inventive concept. For example, the program 212 may include a plurality of instructions that may be executed by the processor 230, and as the plurality of instructions included in the program 212 are executed by the processor 230, a convolution operation based on color pattern information of input image data may be performed. The system memory 210 may include a volatile memory such as a static random access memory (SRAM) or a dynamic random access memory (DRAM) and may include a non-volatile memory such as a flash memory, as a non-limiting example.

The processor 230 may include at least one core capable of executing any instruction set (for example, Intel architecture-32 (IA-32), 64-bit extended IA-32, x86-64, PowerPC, Sparc, million instructions per second (MIPS), asynchronous response mode (ARM), IA-64, and so on). The processor 230 may execute instructions stored in the system memory 210 and may perform a convolution operation based on color pattern information of input image data by executing the program 212.

The storage 250 may not lose stored data even when power supplied to the image processing device 200 is disconnected. For example, the storage 250 may include a non-volatile memory such as an electrically erasable programmable read-only memory (EEPROM), flash memory, a phase change random access memory (PRAM), a resistance random access memory (RRAM), a nano floating gate memory (NFGM), a polymer random access memory (PoRAM), a magnetic random access memory (MRAM), and a ferroelectric random access memory (FRAM), and may include storage media such as a magnetic tape, an optical disk, and a magnetic disk. In some embodiments, the storage 250 may be removable from the image processing device 200.

In some embodiments, the storage 250 may store an image processing program 212 including a convolution operation based on color pattern information of input image data, according to an example embodiment of the inventive concept, and before the program 212 is executed by the processor 230, the program 212 or at least part thereof may be loaded into the system memory 210 from the storage 250. In some embodiments, the storage 250 may store a file written in a programming language, and the program 212 or at least part thereof generated from a file by a compiler or so on may be loaded into the system memory 210.

In some embodiments, the storage 250 may store data to be processed by the processor 230 and/or data processed by the processor 230. For example, the storage 250 may store the trained neural network model, data generated during image processing, and so on.

The input/output devices 270 may include input devices such as a keyboard and a pointing device and may include an output device such as a display device and a printer.

The communication connections 290 may provide access to a network outside the image processing device 200. For example, the network may include computing systems and communication links, and the communication links may include wired links, optical links, wireless links, or any other type of links.

Figure 3A:
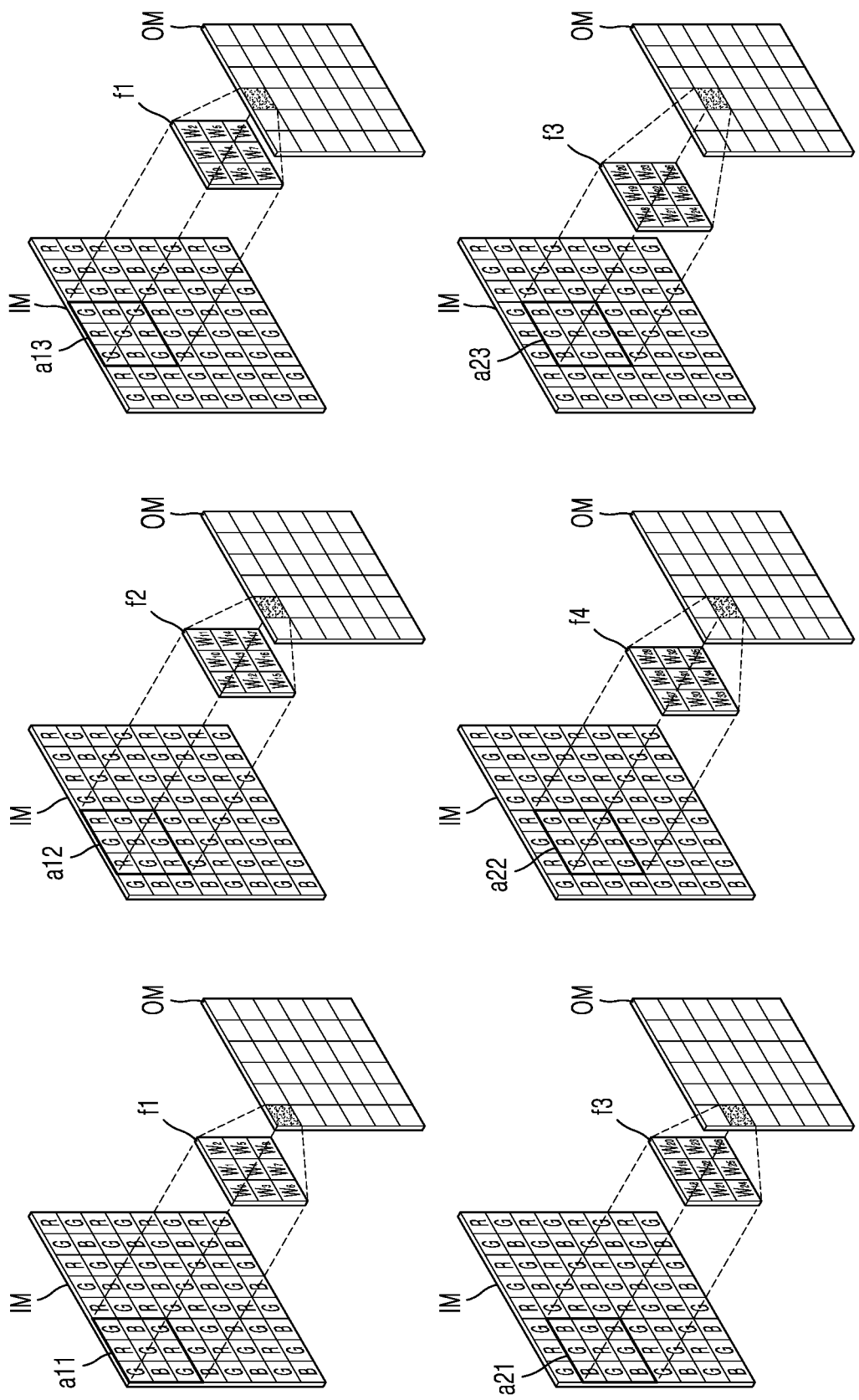
FIG. 3A is a diagram illustrating a process of performing a convolution operation by using an image processing device according to an example embodiment of the inventive concept.
Figure 3B:
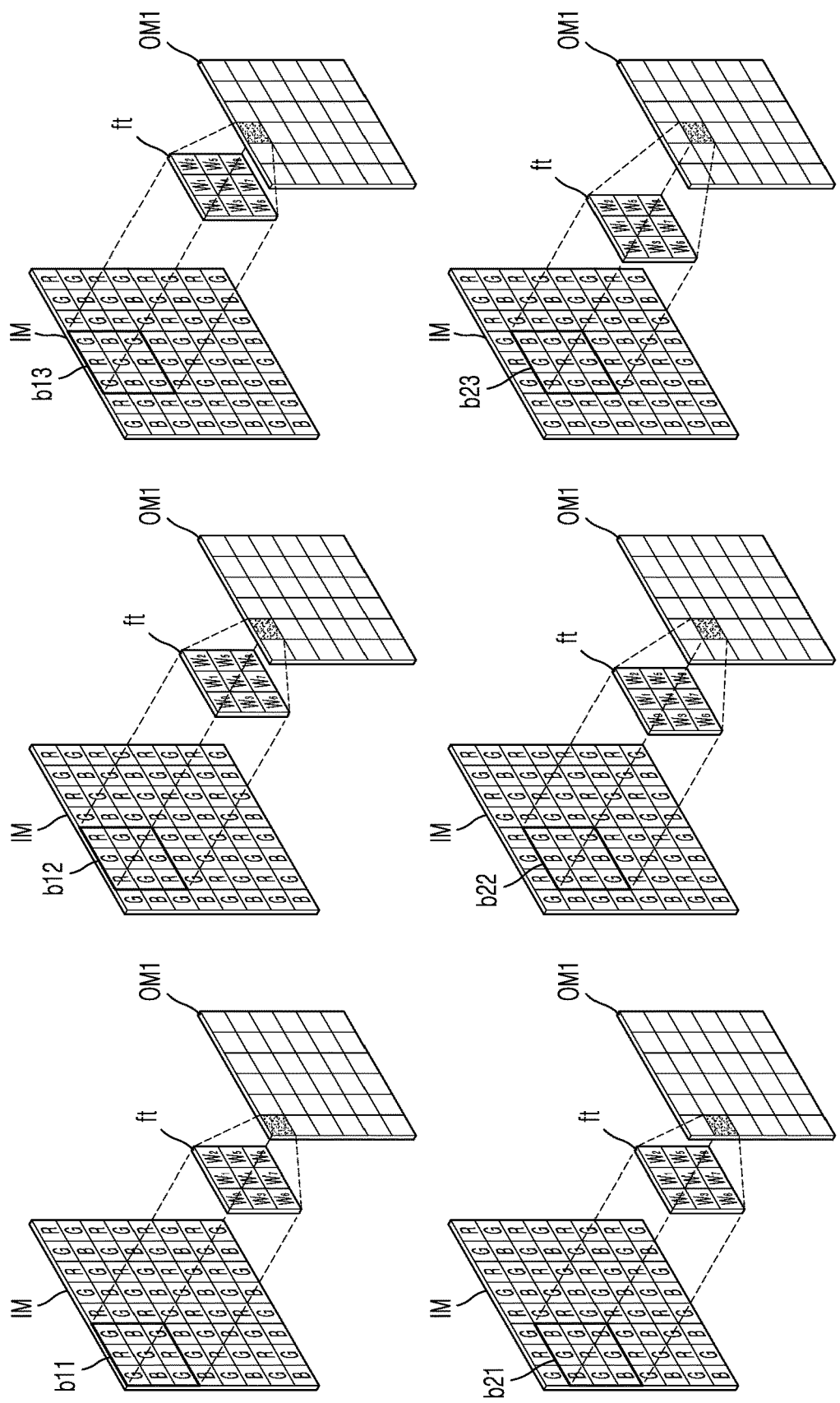
FIG. 3B is a diagram illustrating a comparative example.

FIG. 3A is a diagram illustrating a process of performing a convolution operation by using an image processing device according to an example embodiment of the inventive concept, and FIG. 3B is a diagram illustrating a comparative example.

FIG. 3A illustrates that a convolution operation is performed by using different convolution filters according to color patterns of respective pixels when the convolution operation is performed, and FIG. 3B illustrates that a convolution operation is performed by using the same convolution filter regardless of the color patterns of the respective pixels when the convolution operation is performed. Embodiments of the convolution operation described with reference to FIGS. 3A to 10 may be performed in a demosaicking operation of changing various input color patterns including the Bayer pattern into RGB images or may be utilized in various image processing operations including remosaicking, deblurring and/or denoising. The demosaicking may be image processing for reconstructing a full-color image from incomplete color samples and may be, for example, an image processing process of restoring a Bayer pattern image received from the image sensor into an RGB image suitable to be displayed. The denoising may be image processing for removing noise included in an image, and the deblurring may be image processing for removing blur included in an image. The remosaicking may be image processing for changing a first color pattern image to a second color pattern image. In this case, an input color pattern image, the first color pattern image, and the second color pattern image may include at least one of a Bayer pattern image, a tetra pattern image, a tetra square pattern image, a nona pattern image, and an RGBW pattern image and may include a combination of various other patterns.

Referring to FIG. 3A, an input feature map IM may be data generated through a sensor and a Bayer filter. Small filters of red, blue, and green which are three primary colors of light may be alternately arranged on each individual microlens in the image sensor according to a certain pattern. When the sensor operates, pixels having the same color filter receive signals separately, and respective signal values are classified into R, G, and B channels. Next, three channels are synthesized by using an additive mixing method, and thereby, a color image may be completed. Each pixel of a Bayer image has only one piece of color information and may correspond to BGGR, RGGB, and so on depending on patterns of the sensor. In addition to the Bayer filter, an input feature map (IM) may include images generated by various color filters such as a tetra filter, a tetra square filter, a nona filter, and an RGBW filter.

The input feature map IM may have a size of H rows and W columns (H and W are natural numbers), and each filter may have a size of R rows and S columns. The input feature map IM may include D channels, and filters may include channels corresponding to the number of channels (or a depth D) of the input feature map IM. An output feature map OM may be generated through a second dimension (2D) or 3D convolution operation between the input feature maps and filters and may include Y channels according to the convolution operation.

For example, the output feature map OM may be generated through a convolution operation between one input feature map IM and a filter. For the sake of convenient description, it is assumed that the input feature map IM has a size of 8×8, the filter has a size of 3×3, and the output feature map OM has a size of 6×6, but the inventive concept is not limited thereto, and the neural network may be implemented by feature maps and kernels of various sizes. In addition, values defined in the input feature map IM, the filter, and the output feature map OM are all example values, and embodiments according to the inventive concept are not limited thereto.

The filter may perform a convolution operation while sliding in the input feature map IM in units of a 3×3 window. The convolution operation may indicate an operation to obtain each feature data of the output feature map OM by summing all values obtained by multiplying each feature data of a certain window of the input feature map IM by each weight value of a corresponding position in the filter. Data included in the window of the input feature map IM, that are to be multiplied by the weight values, may be referred to as extraction data extracted from the input feature map IM.

According to the inventive concept, the filter may be selected among a plurality of filters according to color patterns of the extraction data extracted from the input feature map IM. For example, a first filter f1 may be selected for extraction data a11 of the input feature map IM, and a second filter f2 may be selected for extraction data a12. Because extraction data a13 has the same color pattern as the extraction data a11, the first filter f1 may be selected, and then the filter may be repeatedly selected.

In extraction data a21 of the input feature map IM, a color pattern changes according to a change in a row of a 3×3 window, and thus, a third filter f3 is selected, and s fourth filter f4 may be selected for extraction data a22. Extraction data a23 has the same color pattern as the extraction data a21, and thus, the third filter f3 may be selected. The extraction data of the input feature map IM may have a total of four color patterns, and thus, one of the first filter f1 to the fourth filter f4 may be selected. In this case, the first filter f1 may include weight parameters W0 to W8, the second filter f2 may include weight parameters W9 to W17, the third filter f3 may include weight parameters W18 to W26, and the fourth filter f4 may include weight parameters of W27 to W35. The convolution operation described with reference to FIG. 3A may be utilized in various image processing operations including demosaicking, denoising, and/or deblurring.

Referring to FIG. 3B, an output feature map OM1 may be generated through a convolution operation between the input feature map IM1 and a filter ft. It may be assumed that the input feature map IM1 has a size of 8×8, the filter ft has a size of 3×3, and the output feature map OM1 has a size of 6×6.

The filter ft may perform a convolution operation while sliding in the input feature map IM in units of a 3×3 window. The convolution operation may indicate an operation to obtain each feature data of the output feature map OM by summing all values obtained by multiplying each feature data of a certain window of the input feature map IM by each weight value of a corresponding position in the filter ft. Data included in the window of the input feature map IM, that are to be multiplied by weight values, may be referred to as extraction data extracted from the input feature map IM. In FIG. 3B, the filter ft may perform a convolution operation regardless of color patterns of the extraction data extracted from the input feature map IM. The filter ft may include weight parameters of W0 to W8.

Figure 4:
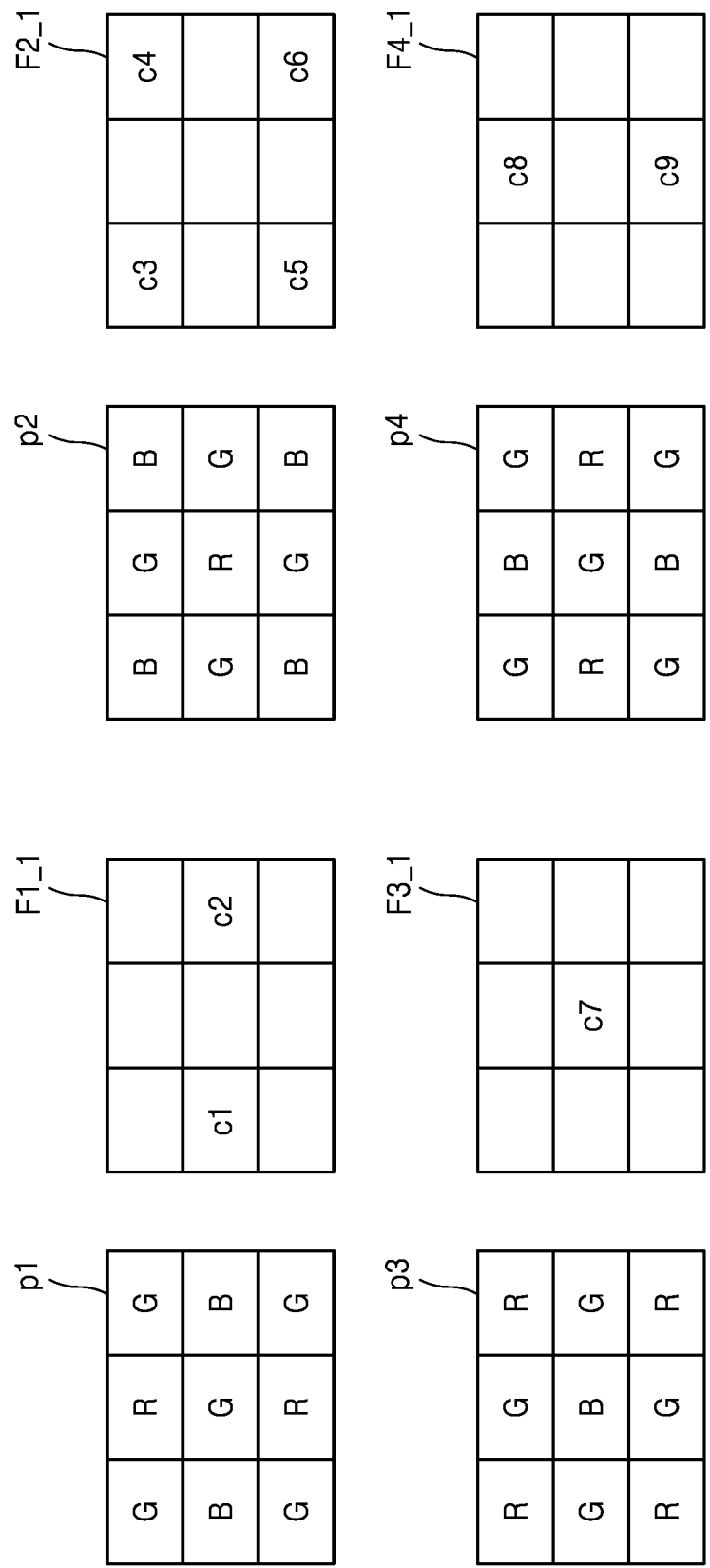
FIG. 4 is a diagram illustrating a process of estimating pixel data through a convolution operation by using an image processing device according to an example embodiment of the inventive concept.

FIG. 4 is a diagram illustrating a process of estimating pixel data through a convolution operation by using an image processing device according to an example embodiment of the inventive concept.

When an input image is a Bayer pattern image, one pixel has information on only one of R (red), G (green), and B (blue), and the rest information may be estimated based on information on peripheral pixels. For example, information on a pixel in the center may be estimated by performing a convolution operation of extraction data having a size of 3×3 extracted from an input image and a filter.

Referring to FIG. 4, a first region p1 includes information in the order of G, R, G, B, G, B, G, R, and G from an upper left pixel. A pixel in the center of the first region p1 includes only G information, and information of B pixels on the left and right may be referred to in order to estimate a B value of the pixel in the center of the first region p1. In this case, a first filter F1_1 may have weight values c1 and c2 at positions of the B pixels. A B value of a pixel in the center of the first region p1 may be estimated through a convolution operation of the first region p1 and the first filter F1_1.

A B value of a pixel in the center of a second region p2 may be estimated through a convolution operation of a second region p2 and a second filter F2_1. A B value of a pixel in the center of a third region p3 may be estimated through a convolution operation of a third region p3 and a third filter F3_1. A B value of a pixel in the center of a fourth region p4 may be estimated through a convolution operation of a fourth region p4 and a fourth filter F4_1.

When a general convolution operation is performed, a filter with the same weight value is applied even when an operation position is changed, and thus, in order to apply four different convolution operations to the first region p1 to the fourth region p4, a 3×3×1×4 filter having an input channel of 1 and an output channel of 4 need to be used. In this case, when a size of an input image is H×W, the number of required multiplication operations may be H×W×3×3×1×4=H×W×36. On the other hand, when applying a convolution operation method according to the inventive concept, the number of required multiplication operations may be reduced. A convolution operation method of FIG. 4 illustrates an example of a Bayer pattern image, but application of the convolution operation method is not limited thereto and may be utilized to process images generated by various color filters, such as tetra pattern images, tetra square pattern images, nona pattern images, and RGBW pattern images, in addition to the Bayer pattern image.

Figure 5A:
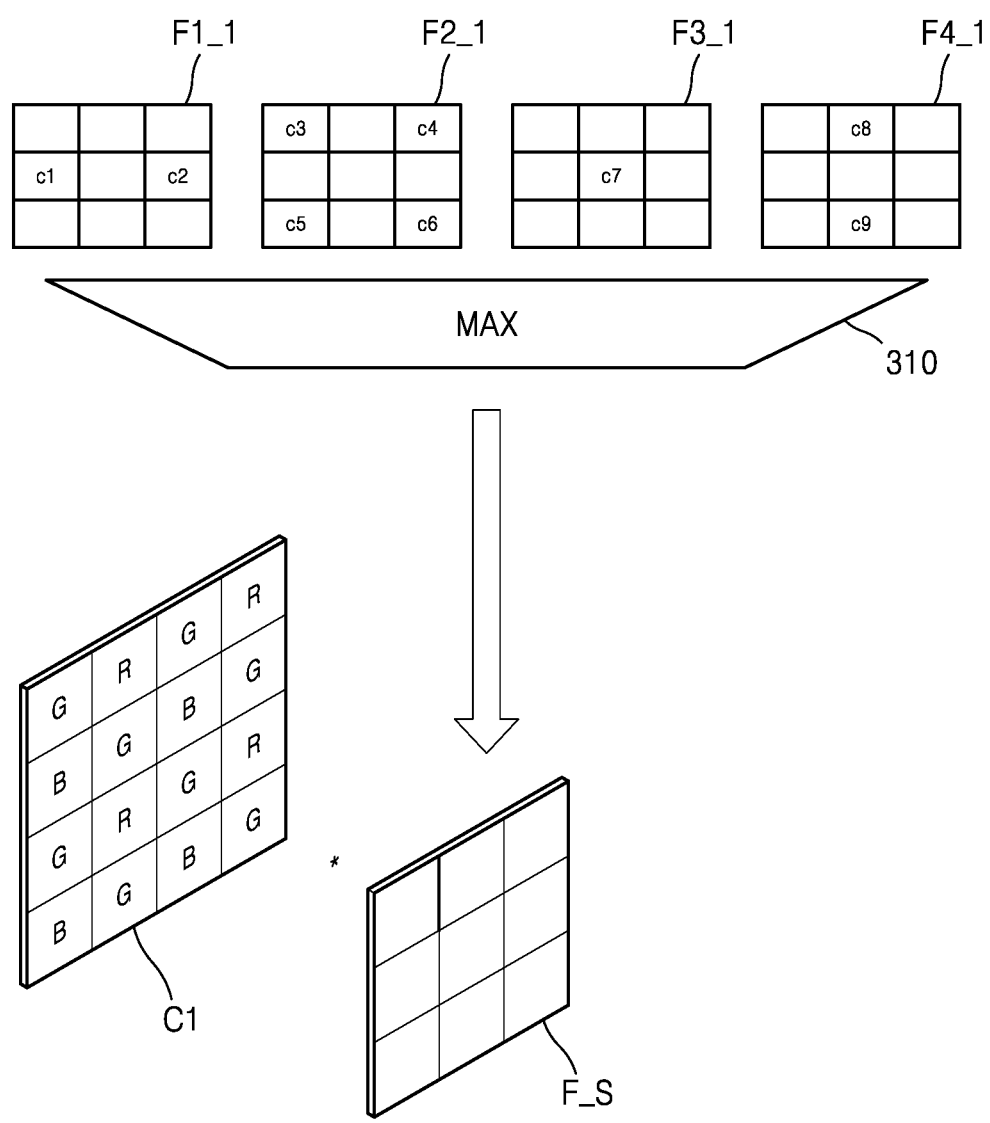
FIGS. 5A and 5B are diagrams illustrating a process of performing a convolution operation by using an image processing device according to an example embodiment of the inventive concept.
Figure 5B:
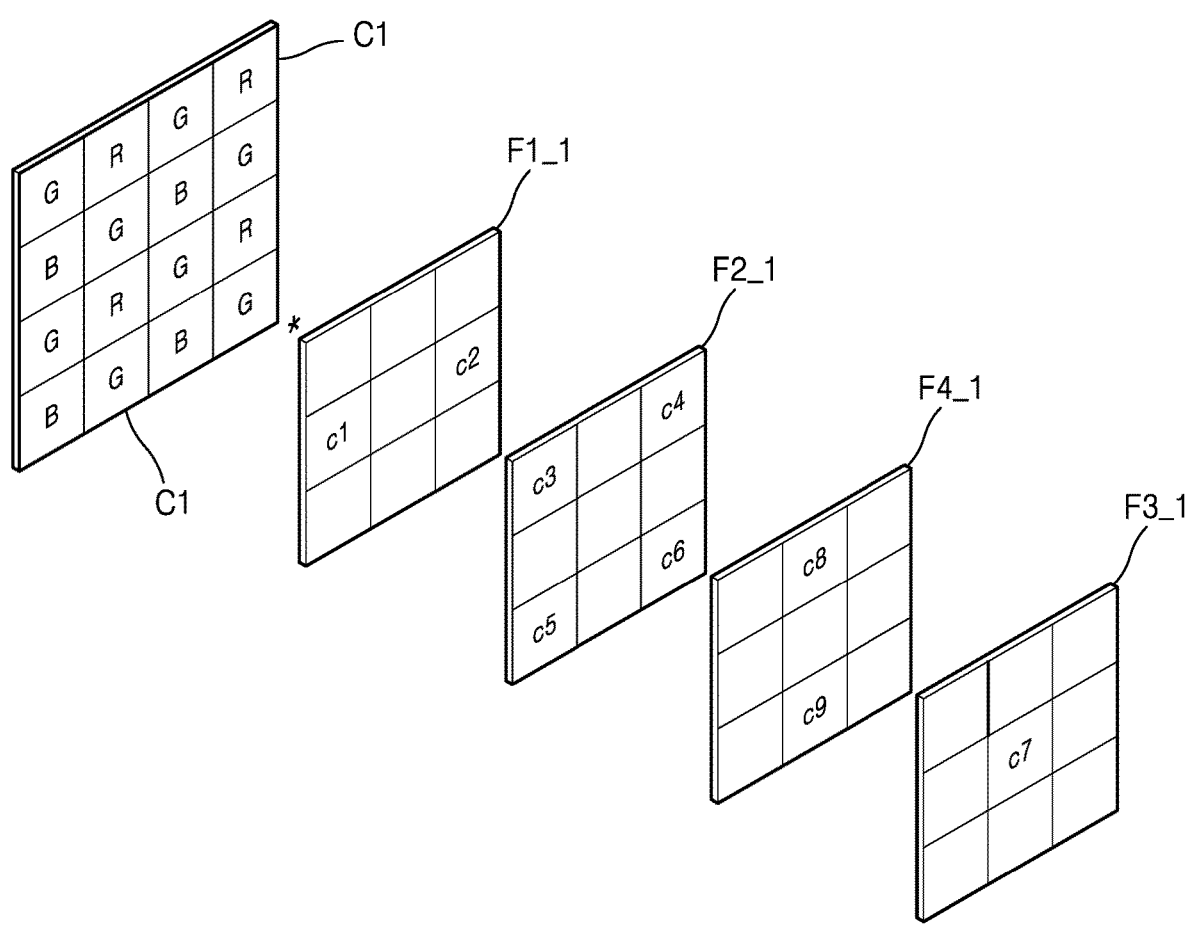

FIGS. 5A and 5B are diagrams illustrating a process of performing a convolution operation by using an image processing device according to an example embodiment of the inventive concept.

Referring to FIGS. 4 and 5A, when a convolution operation is performed using a filter and extraction data extracted from an input image C1, a filter corresponding to extraction data among the first filter F1_1 to the fourth filter F4_1 may be selected by a multiplexer 310. Accordingly, a convolution operation may be performed for the input image C1 and a filter F_S selected by the multiplexer 310. That is, only one filter of four filters is selected to be used according to a color pattern of a pixel, and thus, the number of multiplications is H×w×3×3×1×1=H×w×9, and the amount of calculation may be reduced to ¼ compared to a convolution operation of FIG. 5B. Reduction in the amount of computation may lead to reduction in computation time and power consumption, and thus, an image processing device may efficiently perform image processing including demosaicking, denoising, and/or deblurring.

FIGS. 6A to 6D are diagrams illustrating a process of performing a convolution operation by using an image processing device according to an example embodiment of the inventive concept.

Figure 6A:
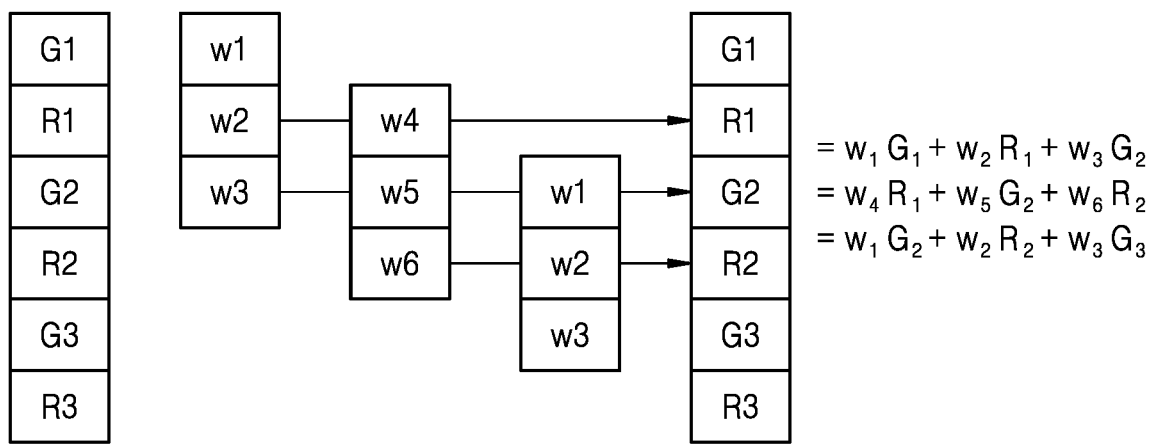
FIGS. 6A, 6B, 6C, and 6D are diagrams illustrating a process of performing a convolution operation by using an image processing device according to an example embodiment of the inventive concept.

Referring to FIG. 6A, weights to be used may change depending on whether red data is estimated from a green pixel and whether green data is estimated from a red pixel. For example, in order to estimate green data from the first red pixel R1, a sum of a value obtained by multiplying a first weight w1 by data of a first green pixel G1, a value obtained by multiplying a second weight w2 by information of a first red pixel R1, and a value obtained by multiplying a third weight w3 by data of a second green pixel G2 may be used. When estimating red data from the second green pixel G2, a weight value different from when estimating green data from the first red pixel R1 may be used. In order to estimate the red data from the second green pixel G2, a sum of a value obtained by multiplying a fourth weight w4 by data of the first red pixel R1, a value obtained by multiplying a fifth weight w5 by the data of the second green pixel G2, and a value obtained by multiplying a sixth weight w6 by data of a second red pixel R2 may be used.

Figure 6B:
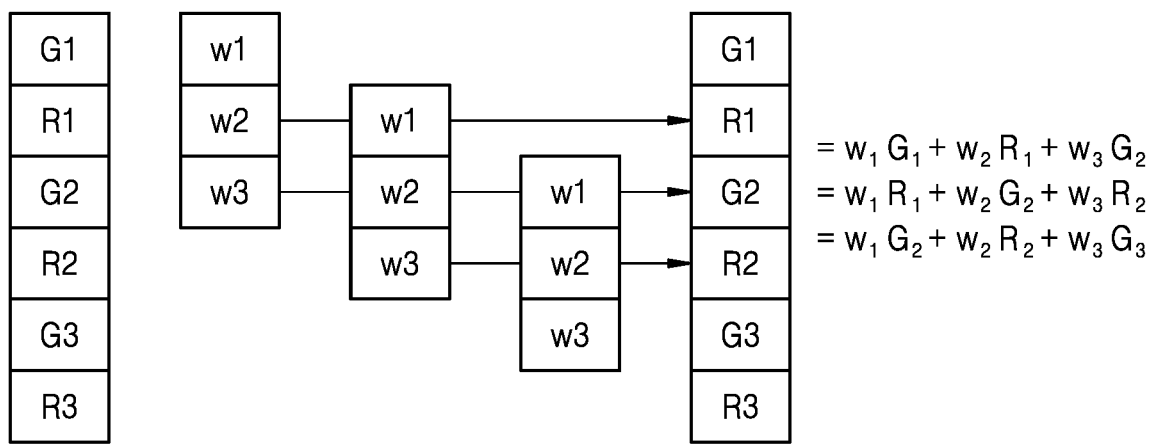

Referring to FIG. 6B, the same weight values w1, w2, and w3 may be used when estimating data from a green pixel and when estimating data from a red pixel.

Figure 6C:
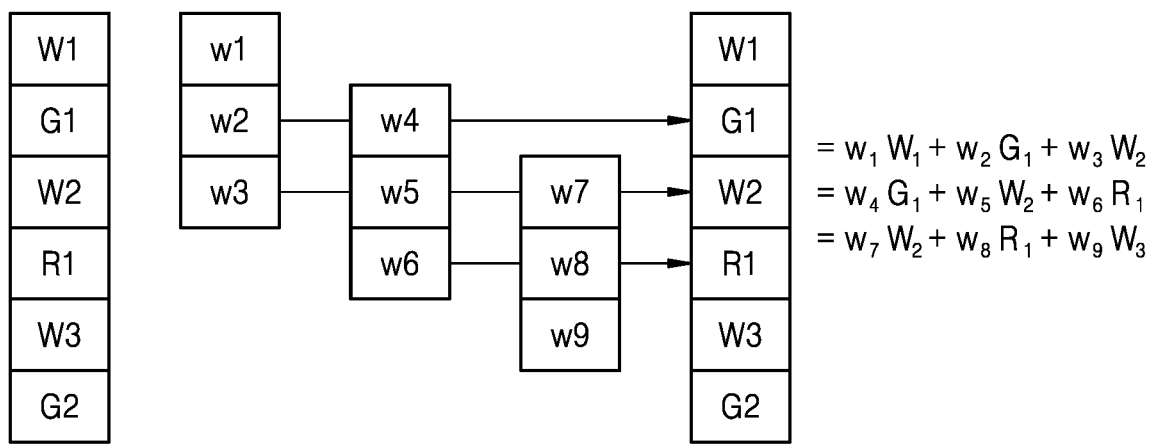

Referring to FIG. 6C, different weights may be respectively used when estimating data from a white pixel, when estimating data from a green pixel, and when estimating data from a red pixel.

Figure 6D:
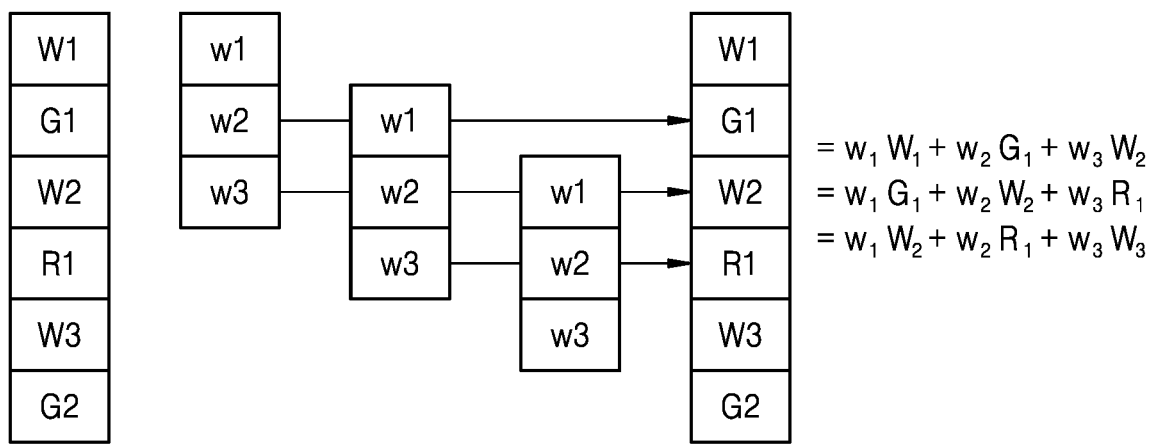

Referring to FIG. 6D, the same weight values w1, w2, and w3 may be used when estimating data from a white pixel, when estimating data from a green pixel, and when estimating data from a red pixel.

Figure 7A:
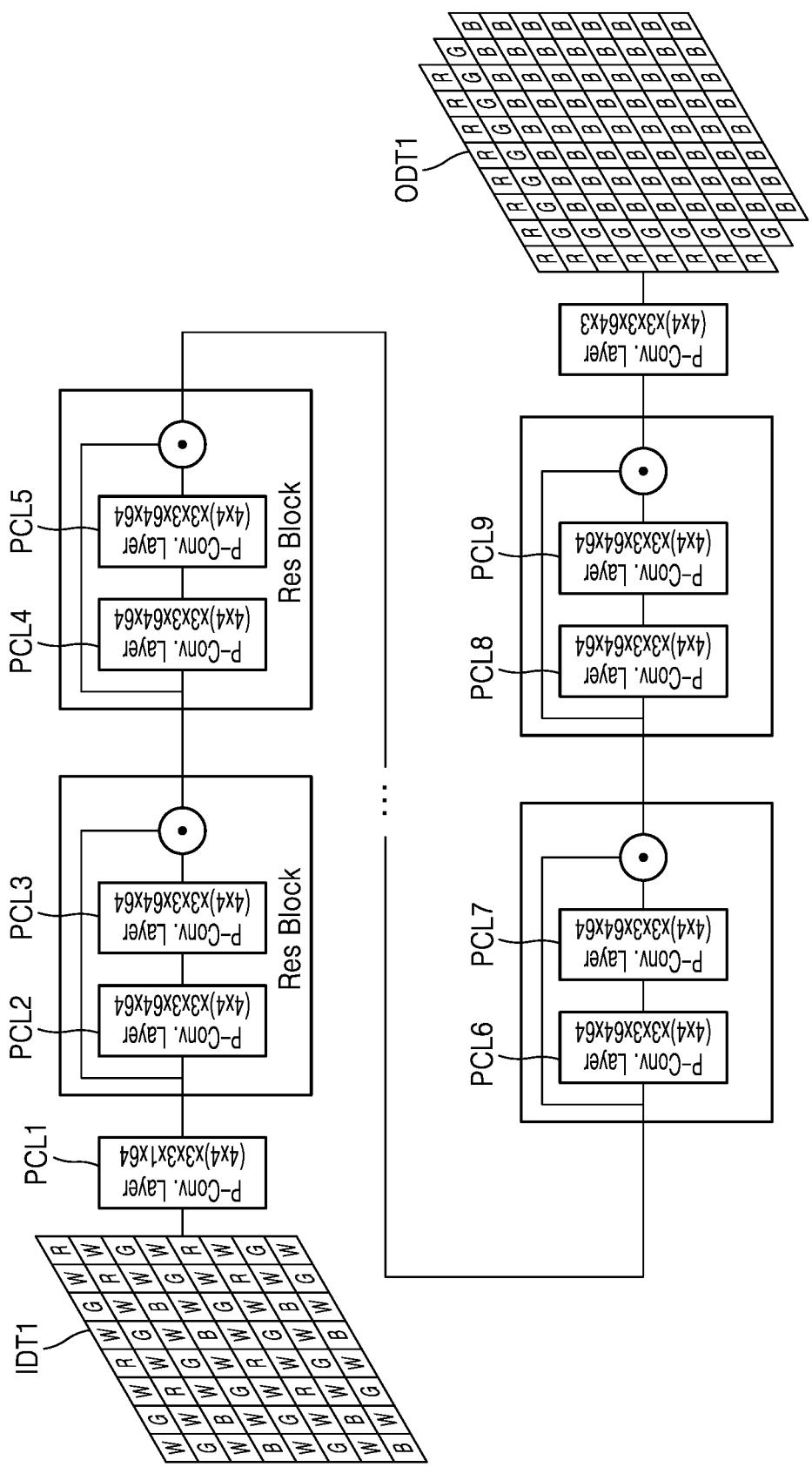
FIGS. 7A and 7B are diagrams illustrating a neural network model to which a convolution operation method according to an example embodiment of the inventive concept is applied.
Figure 7B:
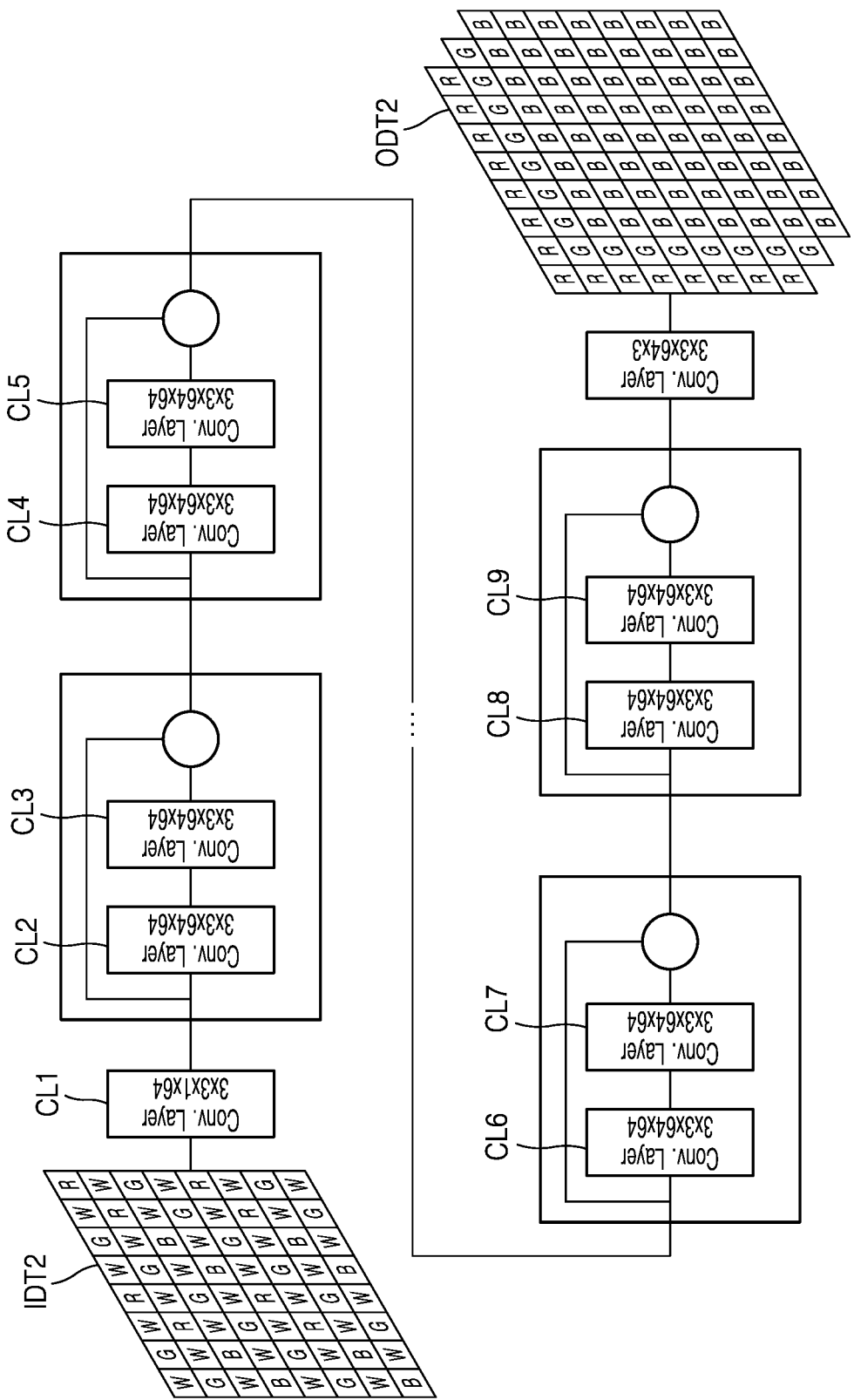

FIGS. 7A and 7B are diagrams illustrating a neural network model to which a convolution operation method according to an example embodiment of the inventive concept is applied.

A convolution operation method performed by an image processing device may be applied to a Resnet model. The Resnet model may be generated by adding convolutional layers to be deepened and then adding shortcuts, basically based on a structure of VGG-19.

Referring to FIG. 7A, a method of using convolution having weight values that change according to color pattern information according to an example embodiment may be applied to respective convolutional layers of the Resnet model. In this case, the method of using convolution having weight values that change according to color pattern information may be applied to at least one convolutional layer among a first convolutional layer PCL1 to a ninth convolutional layer PCL9.

FIG. 7B is an existing Resnet model to which the method of using convolution having weights changing according to color pattern information is not applied to the respective convolutional layers.

Figure 8A:
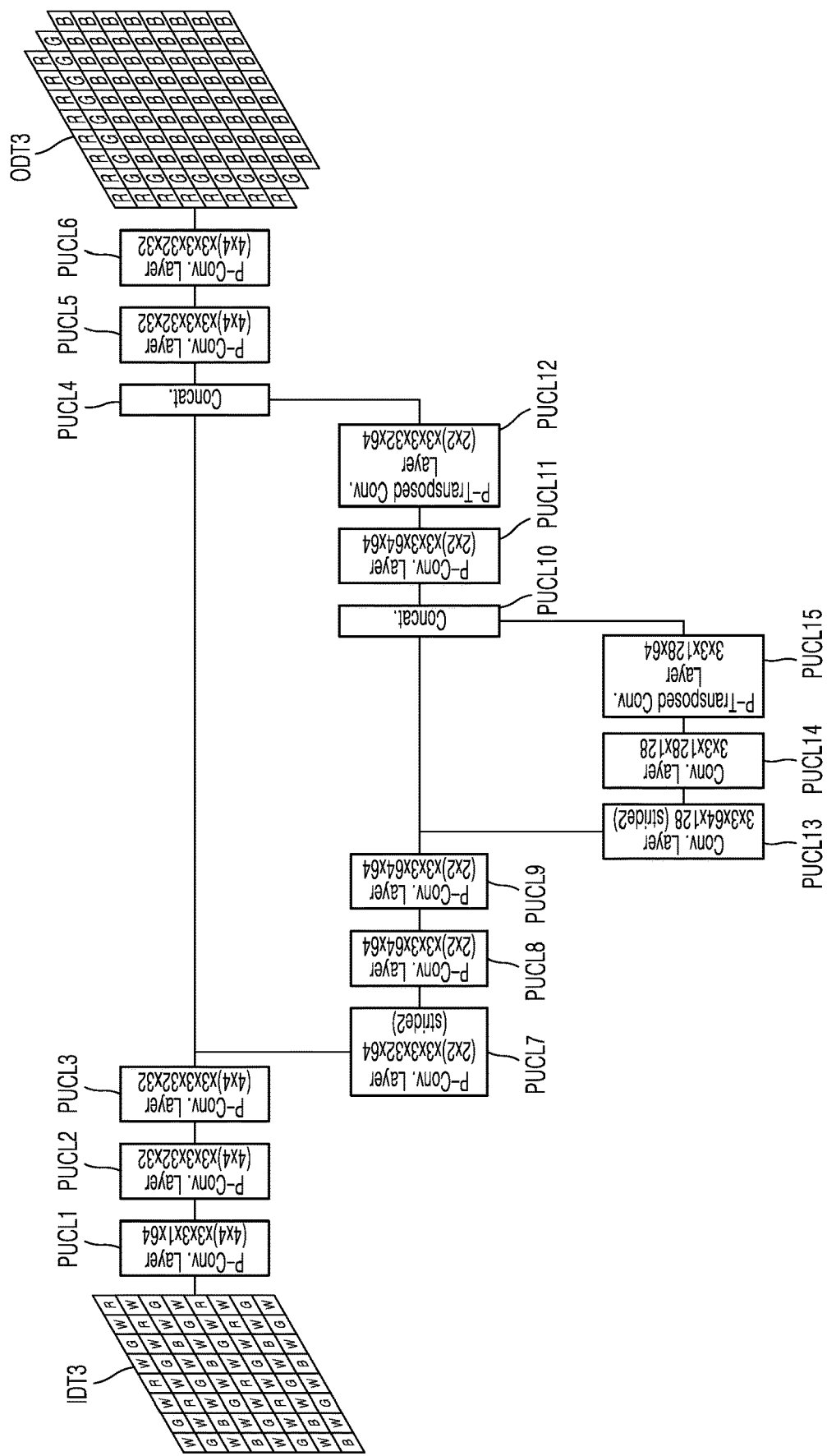
FIGS. 8A and 8B are diagrams illustrating a neural network model to which a convolution operation method according to an example embodiment of the inventive concept is applied.
Figure 8B:
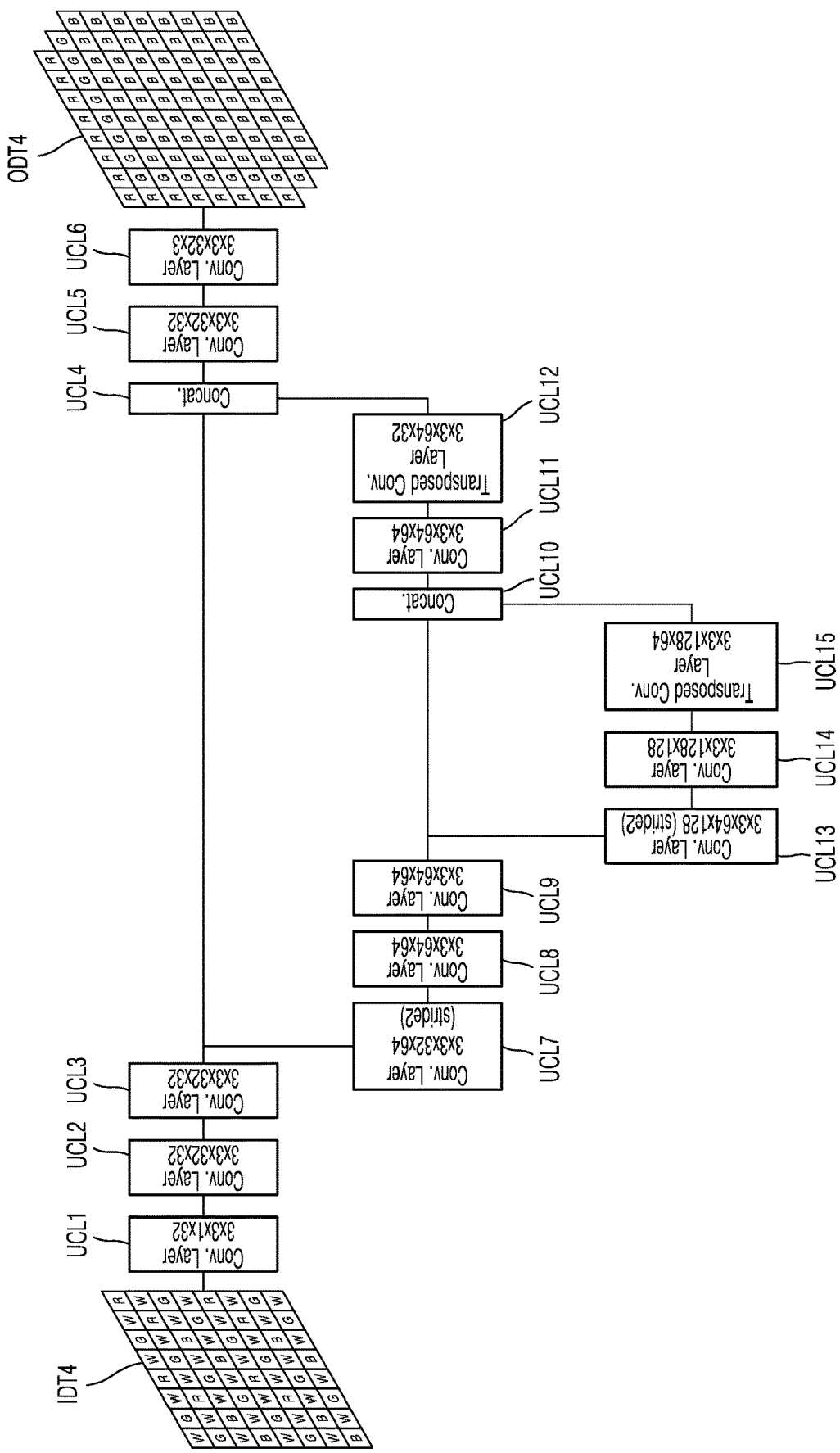

FIGS. 8A and 8B are diagrams illustrating neural network models to which a convolution operation method according to an example embodiment of the inventive concept is applied.

The convolution operation method performed by the image processing device according to an example embodiment may be applied to a Unet model. The Unet model may include an artificial neural network that extracts characteristics of an image by using both low-dimensional information and high-dimensional information and may be used in processes of transforming the entire image, such as color restoration.

Referring to FIG. 8A, the method of using convolution having weight values that change according to color pattern information according to an example embodiment may be applied to respective convolutional layers of the Unet model. In this case, the method of using convolution having weight values that change according to color pattern information may be applied to at least one convolutional layer among a first convolutional layer PUCL1 to a fifteenth convolutional layer PUCL15.

FIG. 8B is an existing Unet model in which the method of using convolution having weight values changing according to color pattern information is not applied to the respective convolutional layers.

FIG. 9 is a diagram illustrating the type of input data of an image processing device according to an example embodiment of the inventive concept.

The input data of the image processing device may include various types of color patterns. A first color pattern cp1 may include a 2×2 Bayer pattern, and a second color pattern cp2 may include a 4×4 tetra pattern. A third color pattern cp3 may include a 4×4 first RGBW pattern. A fourth color pattern cp4 may include a 9×9 nona pattern. A fifth color pattern cp5 may include a 4×4 second RGBW pattern. A sixth color pattern cp6 may include an 8×8 tetra square pattern.

In the image processing process or convolution operation process described in FIGS. 1 to 8, color patterns including the first color pattern cp1 to the sixth color pattern cp6 may be used as input data, and a color pattern in the form of a combination of multiple color patterns may be used as input data, and various other color patterns, other than those illustrated in FIG. 9, may be used as input data.

Figure 10:
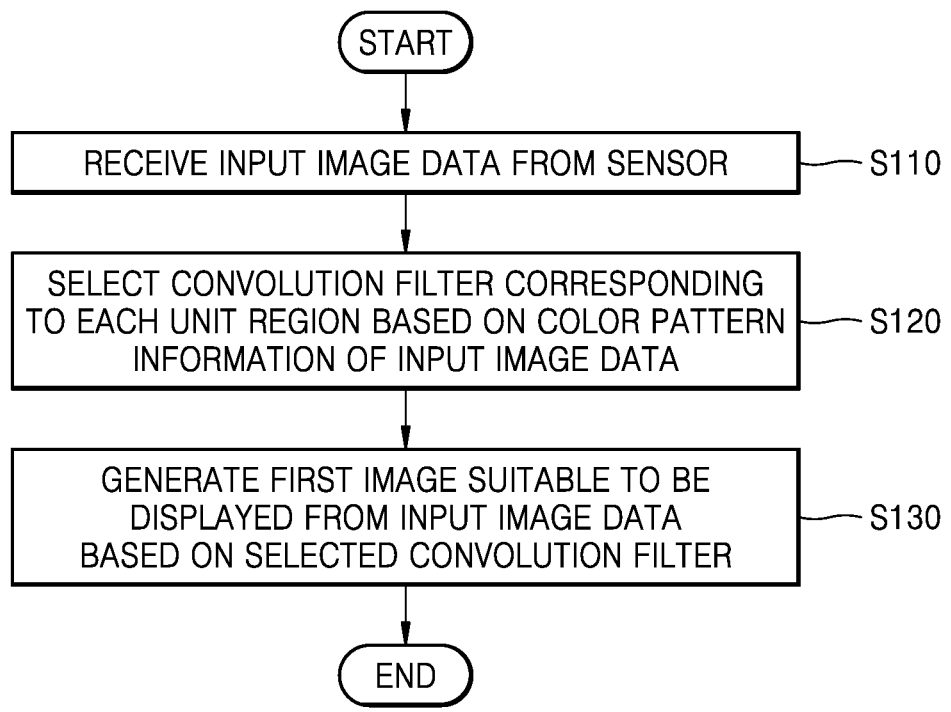
FIG. 10 is a flowchart illustrating an image processing method according to an example embodiment of the inventive concept.

FIG. 10 is a flowchart illustrating an image processing method according to an example embodiment of the inventive concept.

An image processing device may receive input image data from an image sensor (S110). The input image data may include data patterns according to types of a sensing array provided in the image sensor, such as, for example but not limited to, a Bayer pattern, a Bayer pattern-based tetracell, a Bayer pattern-based nonacell, an RGBW pattern or a tetra pattern, an RGB pattern, an RGBG pattern, and an RGBW pattern. In this case, the RGB pattern indicates a pattern having a structure in which a red pixel value, a green pixel value, and a blue pixel value are repeated, and the RGBG pattern indicates a pattern having a structure in which a red pixel value, a green pixel value, a blue pixel value, and a green pixel value are repeated, and the RGBW pattern indicates a pattern having a structure in which a red pixel value, a green pixel value, a blue pixel value, and a white pixel value are repeated.

The image processing device may select a convolution filter corresponding to each unit region based on color pattern information of the input image data (S120). The color pattern information may include patterns of pixels in the unit regions on which a convolution operation is performed. The unit regions may include a region of extraction data obtained by extracting a certain region from the input image data to perform a convolution operation. The input image data may include first to fourth pixel patterns having R, G, and B Bayer patterns (e.g., BGGR, RGBG, GRBG, and RGGB), and a convolution filter may include first to fourth convolution filters respectively corresponding to the first to fourth pixel patterns.

The image processing device may generate a first image suitable to be displayed from the input image data based on the selected convolution filter (S130). A first image may be an image of each pixel having a complete RGB value. The image processing device may perform image processing including demosaicking for restoring a Bayer pattern image received from an image sensor into an RGB image suitable to be displayed, denoising for removing at least one of artifacts or noise generated during the demosaicking, and/or removing noise of an input image including the Bayer pattern image.

The image processing system may train a neural network model used by an image processing device. For example, the image processing system may train the neural network model to predict a first image suitable to be displayed from learning data including input image data received from an image sensor. The neural network model may include a convolution filter to which different weight parameters for each pixel are applied based on a pattern of the input image data and phase information. The neural network model may be constructed based on at least one of a convolutional neural network-based Resnet architecture and a Unet architecture for extracting characteristics of an image by using both low-dimensional information and high-dimensional information.

Figure 11:
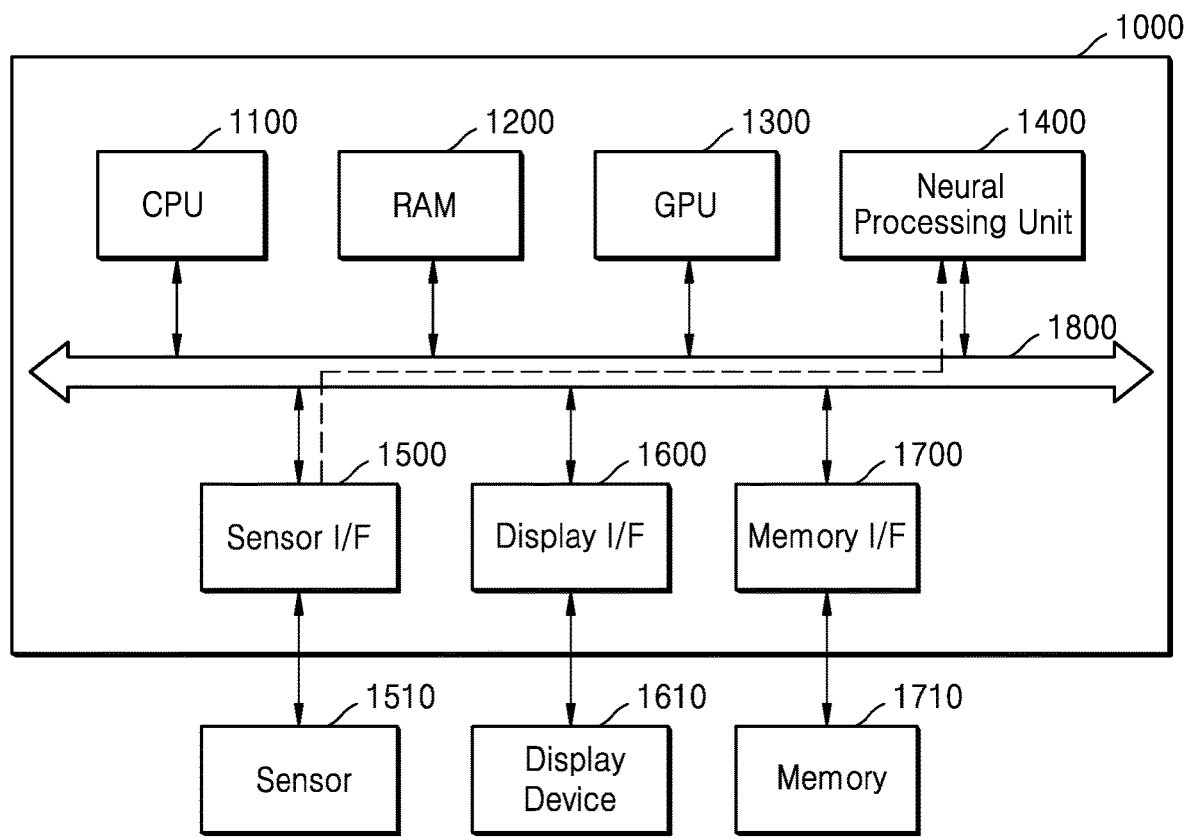
FIG. 11 is a block diagram illustrating an integrated circuit according to an example embodiment of the inventive concept and a device including the same.

FIG. 11 is a block diagram illustrating an integrated circuit according to an example embodiment of the inventive concept and a device including the integrated circuit.

A device 2000 may include an integrated circuit 1000 and components connected to the integrated circuit 1000, for example, a sensor 1510, a display device 1610, and a memory 1710. The device 2000 may process data based on a neural network. For example, the device 2000 may include a mobile device such as a smartphone, a game device, a wearable device, or so on.

The integrated circuit 1000 according to an example embodiment of the inventive concept may include a central processing unit (CPU) 1100, a random access memory (RAM) 1200, a GPU 1300, a neural processing unit 1400, a sensor interface 1500, a display interface 1600, and a memory interface 1700. In addition to this, the integrated circuit 1000 may further include other general-purpose components such as a communication module, a DSP, and a video module, and the respective components (e.g., the CPU 1100, the RAM 1200, the GPU 1300, the neural processing unit 1400, the sensor interface 1500, the display interface 1600, and the memory interface 1700) of the integrated circuit 1000 may transmit and receive data to and from each other through a bus 1800. In one embodiment, the integrated circuit 1000 may include an application processor. In one embodiment, the integrated circuit 1000 may be implemented as a system on chip (SoC).

The CPU 1100 may control all operations of the integrated circuit 1000. The CPU 1100 may include one processor core (single core) or a plurality of processor cores (multi-core). The CPU 1100 may process or execute programs and/or data stored in the memory 1710. In one embodiment, the CPU 1100 may control a function of the neural processing unit 1400 by executing programs stored in the memory 1710.

The RAM 1200 may temporarily store programs, data, and/or instructions. According to one embodiment, the RAM 1200 may be implemented by a DRAM or an SRAM. The RAM 1200 may temporarily store data input/output through the interfaces 1500 and 1600 or data generated by the GPU 1300 or the CPU 1100, such as image data.

In one embodiment, the integrated circuit 1000 may further include a read only memory (ROM). The ROM may store programs and/or data which are continuously used. The ROM may be implemented by an erasable programmable ROM (EPROM) or an EEPROM.

The GPU 1300 may perform image processing on image data. For example, the GPU 1300 may perform image processing on image data received through the sensor interface 1500. The image data processed by the GPU 1300 may be stored in the memory 1710 or provided to the display device 1610 through the display interface 1600. Image data stored in the memory 1710 may be provided to the neural processing unit 1400.

The sensor interface 1500 may interface data (for example, image data, audio data, and so on) input from the sensor 1510 connected to the integrated circuit 1000.

The display interface 1600 may interface data (for example, an image) output to the display device 1610. The display device 1610 may output an image or image data through a display such as a liquid-crystal display (LCD) or an active matrix organic light emitting diode (AMOLED).

The memory interface 1700 may interface data input from the memory 1710 outside the integrated circuit 1000 or data output to the memory 1710. According to an embodiment, the memory 1710 may be implemented as a volatile memory such as a DRAM or an SRAM or a non-volatile memory such as a resistive random-access memory (ReRAM), a PRAM or a NAND flash. The memory 1710 may be implemented by a memory card (a multi-media card (MMC), an embedded MMC (eMMC), a secure digital (SD) card, or a microSD card) or so on.

The neural network device 110 described with reference to FIG. 1 may be used as the neural processing unit 1400. The neural processing unit 1400 may receive raw data from the sensor 1510 through the sensor interface 1500 to be trained and perform image processing based on training.

In an embodiment, the GPU 1300 may operate as the ISP 130 of FIG. 1, and when an output of the sensor 1510 is to be displayed on the display device 1610, the GPU 1300 may change the raw data from the sensor 1510 into a data format suitable to be displayed, such as RGB data, and provide the data format to the display device 1610 through the display interface 1600. In addition, the GPU 1300 may provide the raw data to the neural processing unit 1400, and the neural processing unit 1400 may generate RGB data based on the raw data.

Figure 12:
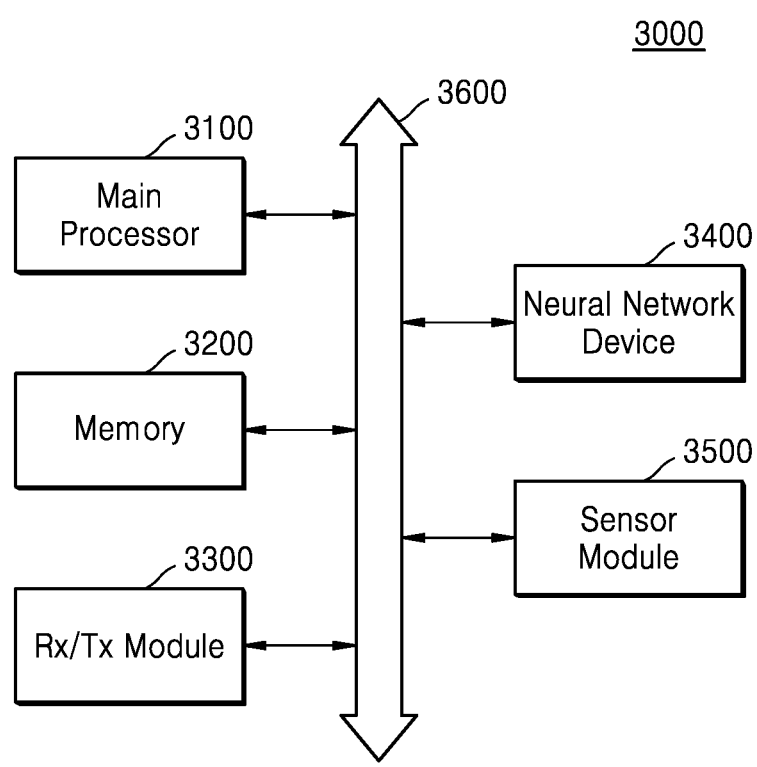
FIG. 12 is a block diagram illustrating a system including a neural network device according to an example embodiment of the inventive concept.

FIG. 12 is a block diagram illustrating a system including a neural network device, according to an example embodiment of the inventive concept.

Referring to FIG. 12, a system 3000 may include a main processor 3100, a memory 3200, a communication module 3300, a neural network device 3400, and a sensor module 3500. Components of the system 3000 may communicate with each other through a bus 3600.

The main processor 3100 may control all operations of the system 3000. For example, the main processor 3100 may include a CPU. The main processor 3100 may include one core (single core) or a plurality of cores (multi-core). The main processor 3100 may process or execute programs and/or data stored in the memory 3200. For example, the main processor 3100 may control the neural network device 3400 to drive a neural network such as a target neural network or a sensor-adaptive network by executing programs stored in the memory 3200 and may also control the neural network device 3400 to generate a sensor-adaptive network through reinforcement training.

The communication module 3300 may include various wired or wireless interfaces capable of communicating with an external device. The communication module 3300 may receive a learned target neural network from a server and may also receive the sensor-adaptive network generated through the reinforcement training. The communication module 3300 may include a communication interface or so on which may be connected to a wired local area network (LAN), a wireless local area network (WLAN) such as wireless fidelity (Wi-Fi), a wireless personal area network (WPAN) such as Bluetooth, wireless Universal Serial Bus (USB), Zigbee, near field communication (NFC), radio-frequency identification (RFID), power line communication (PLC), a mobile cellular network such as third generation (3G), fourth generation (4G), or long term evolution (LTE), or so on.

The sensor module 3500 may be implemented by at least one of various sensors. For example, the sensor module 3500 may include an image sensor and may provide the neural network device 3400 with a video stream generated by imaging an environment outside the system 3000.

The neural network device 3400 may perform a neural network operation based on sensed data, for example, a video stream, received through the sensor module 3500. The neural network device 110 described with reference to FIGS. 1 to 14 may be used as the neural network device 3400. The neural network device 3400 may generate a feature map based on a sensor-adaptive network obtained by adaptively training a sensor on raw data received from the sensor module 3500 rather than the processed data and may apply the feature map as an input of a hidden layer of a target neural network to drive the target neural network. Accordingly, processing speed and accuracy of the system 3000 may be increased, and power consumption may be reduced.

Device according to example embodiments may include a processor, a memory for storing and executing program data, a permanent storage such as a disk drive, a communication port for communicating with an external device, a user interface device such as a touch panel, a key, or a button, and so on. Methods implemented by software modules or algorithms may be recorded on computer-readable recording media as computer-readable codes or program instructions which may be executed by a processor. Here, the computer-readable recording media may include magnetic storage media (for example, ROM, RAM, a floppy disk, a hard disk, and so on), optically readable media (for example, compact disk (CD)-ROM and a digital versatile disk (DVD)), and so on. The computer-readable recording media may be distributed among network-connected computer systems and may store and execute computer-readable codes in a distributed manner. The media may be read by a computer, stored in a memory, and executed by a processor.

The example embodiments may include functional blocks and various processing operations. The functional blocks may be implemented by various types of hardware and/or software that perform certain functions. For example, the embodiment may include integrated circuit configurations, such as memory, processing, logics, look-up tables that may perform various functions by using one or more microprocessors or other control devices. In the same manner that components may be implemented by software programming or software components, the example embodiments may include various algorithms implemented by combinations of data structures, processes, routines or other programming constructs to be implemented by programming languages or scripting languages such as C, C++, Java, and assembler. Functional aspects may be implemented by an algorithm executed by one or more processors. In addition, the example embodiments may employ the related art for electronic environment setting, signal processing, and/or data processing.

While the inventive concept has been particularly shown and described with reference to example embodiments thereof, it will be understood that various changes in form and details may be made therein without departing from the spirit and scope of the following claims and their equivalents.

What is claimed is:

1. An image processing method performed by an image processing device, the image processing method comprising:
   receiving first input image data from a first image sensor;
   selecting, based on color pattern information of the first input image data, a convolution filter corresponding to each unit region, from among a plurality of convolution filters; and
   generating a first image to be displayed from the first input image data, based on the selected convolution filter,
   wherein the first input image data includes a first pixel pattern and a second pixel pattern that is different from the first pixel pattern,
   wherein the selecting comprises selecting, using a multiplexer, one of a first convolution filter and a second convolution filter based on the color pattern information of the first input image data, and applying the selected convolution filter to respective unit regions of the first pixel pattern and the second pixel pattern,
   wherein each of the first convolution filter and the second convolution filter comprises a plurality of weight parameters,
   wherein the first convolution filter comprises first weight parameters corresponding to the first pixel pattern,
   wherein the second convolution filter comprises second weight parameters corresponding to the second pixel pattern, and
   wherein the first weight parameters and the second weight parameters are different.

2. The image processing method of claim 1, wherein the first input image data further includes a third pixel pattern and a fourth pixel pattern, and
   wherein the first to the fourth pixel patterns have R, G, and B Bayer patterns.

3. The image processing method of claim 2, wherein the convolution filter includes the first convolution filter, the second convolution filter, a third convolution filter, and a fourth convolution filter, respectively corresponding to the first to the fourth pixel patterns.

4. The image processing method of claim 1, further comprising:
   training a neural network model to predict the first image to be displayed from learning data including second input image data received from a second image sensor.

5. The image processing method of claim 4, wherein the neural network model includes a convolution filter to which different weight parameters for each pixel are applied based on a pattern of the second input image data and phase information.

6. The image processing method of claim 1, wherein the image processing device includes a neural network model constructed based on at least one of a convolutional neural network-based Resnet architecture or a Unet architecture for extracting characteristics of an image by using both low-dimensional information and high-dimensional information.

7. The image processing method of claim 1, wherein the generating the first image comprises image processing including at least one of demosaicking for restoring a color pattern image received from the first image sensor into an RGB image to be displayed, remosaicking for changing a first color pattern image into a second color pattern image, deblurring for removing a blur from the color pattern image, or denoising for removing at least one of an artifact or a noise generated during the demosaicking or included in the color pattern image, and
   wherein the color pattern image includes at least one of a Bayer pattern image, a tetra pattern image, a tetra square pattern image, a nona pattern image, or an RGBW pattern image.

8. The image processing method of claim 1, wherein the first input image data includes image data of at least one of color filters including a Bayer pattern, a Bayer pattern-based tetracell, a Bayer pattern-based nonacell, an RGBW pattern, and a tetra pattern.

9. The image processing method of claim 1, wherein the generating the first image includes performing a series of convolutions, and
   wherein at least one of the series of convolutions is based on the selected convolution filter.

10. An image processing device comprising:
    a memory configured to store a program; and
    a processor configured to execute the program stored in the memory and operate as instructed by the program to:
    receive input image data from an image sensor and select, based on color pattern information of the input image data, a convolution filter corresponding to each unit region, from among a plurality of convolution filters, to be applied to the input image data, wherein the input image data includes a first pixel pattern and a second pixel pattern that is different from the first pixel pattern, wherein the processor is configured to select, using a multiplexer, one of a first convolution filter and a second convolution filter based on the color pattern information of the input image data, and apply the selected convolution filter to respective unit regions of the first pixel pattern and the second pixel pattern, wherein each of the first convolution filter and the second convolution filter comprises a plurality of weight parameters, wherein the first convolution filter comprises first weight parameters corresponding to the first pixel pattern, wherein the second convolution filter comprises second weight parameters corresponding to the second pixel pattern, and wherein the first weight parameters and the second weight parameters are different.

11. The image processing device of claim 10, wherein the input image data further includes a third pixel pattern and a fourth pixel pattern, wherein the first to the fourth pixel patterns have R, G, and B Bayer patterns, and wherein the plurality of convolution filters include the first convolution filter, the second convolution filter, a third convolution filter, and a fourth convolution filter, respectively corresponding to the first to the fourth pixel patterns.

12. The image processing device of claim 10, further comprising:

a neural network model constructed based on at least one of a convolutional neural network-based Resnet architecture or a Unet architecture for extracting characteristics of an image by using both low-dimensional information and high-dimensional information.

13. The image processing device of claim 10, wherein the processor is further configured to perform image processing including at least one of demosaicking for restoring a color pattern image received from the image sensor into an RGB image to be displayed, remosaicking for changing a first color pattern image into a second color pattern image, deblurring for removing a blur from the color pattern image, or denoising for removing at least one of an artifact or a noise generated during the demosaicking or included in the color pattern image, and wherein the color pattern image includes at least one of a Bayer pattern image, a tetra pattern image, a tetra square pattern image, a nona pattern image, or an RGBW pattern image.

14. The image processing device of claim 10, wherein the input image data includes image data of at least one of color filters including a Bayer pattern, a Bayer pattern-based tetracell, a Bayer pattern-based nonacell, an RGBW pattern, and a tetra pattern.

15. The image processing device of claim 10, wherein the processor is further configured to generate, based on the selected convolution filter, from the input image data a first image to be displayed.

16. An image processing system comprising:

a first image sensor configured to generate a Bayer pattern image based on a received optical signal;

an image signal processor configured to convert the Bayer pattern image received from the first image sensor into an RGB image to be displayed; and a display configured to display the RGB image, wherein the image signal processor is further configured to select a convolution filter corresponding to each unit region, from among a plurality of convolution filters, based on color pattern information of the Bayer pattern image, wherein the Bayer pattern image includes a first pixel pattern and a second pixel pattern that is different from the first pixel pattern, wherein the selecting comprises selecting, using a multiplexer, one of a first convolution filter and a second convolution filter based on the color pattern information of the Bayer pattern image, and applying the selected convolution filter to respective unit regions of the first pixel pattern and the second pixel pattern, wherein each of the first convolution filter and the second convolution filter comprises a plurality of weight parameters, wherein the first convolution filter comprises first weight parameters corresponding to the first pixel pattern, wherein the second convolution filter comprises second weight parameters corresponding to the second pixel pattern, and wherein the first weight parameters and the second weight parameters are different.

17. The image processing system of claim 16, wherein the Bayer pattern image further includes a third pixel pattern and a fourth pixel pattern, wherein the first to the fourth pixel patterns have R, G, and B Bayer patterns, and wherein the plurality of convolution filters include the first convolution filter, the second convolution filter, a third convolution filter, and a fourth convolution filter, respectively corresponding to the first to the fourth pixel patterns.

18. The image processing system of claim 16, wherein the image signal processor is further configured to generate the RGB image to be displayed from the Bayer pattern image based on the selected convolution filter.

19. The image processing system of claim 16, wherein the image signal processor is further configured to perform image processing including at least one of demosaicking for restoring a color pattern image received from the first image sensor into the RGB image to be displayed, remosaicking for changing a first color pattern image into a second color pattern image, deblurring for removing a blur from the color pattern image, or denoising for removing at least one of an artifact or a noise generated during the demosaicking or included in the color pattern image.

20. The image processing system of claim 16, further comprising:

a neural network device configured to train a neural network model to predict a first image to be displayed from learning data including input image data received from a second image sensor, wherein the neural network model includes a convolution filter to which different weight parameters for each pixel are applied based on a pattern of the input image data and phase information.

* * * * *